United States Patent

Carson

[15] 3,672,715
[45] June 27, 1972

[54] QUICK OPENING CLOSURE CAP

[72] Inventor: Forrest L. Carson, Borger, Tex.

[73] Assignee: J. M. Huber Corporation, Locust, N.J.

[22] Filed: Jan. 11, 1971

[21] Appl. No.: 105,444

[52] U.S. Cl............................292/257, 292/65, 292/256.75
[51] Int. Cl.......................................B65d 45/30, E05c 5/00
[58] Field of Search............292/65, 66, 256.75, 257, 256.73;
49/366, 368, 483, 485, 488, 489; 285/334.4, 336;
220/46 R, 46 P

[56] References Cited

UNITED STATES PATENTS

| 1,664,972 | 4/1928 | Dudderai | 292/257 |
| 3,514,009 | 5/1970 | Emery | 220/32 |
| 2,663,586 | 12/1953 | Gardes | 292/256.75 |
| 3,229,791 | 1/1966 | Soman | 287/189.36 |

Primary Examiner—Robert L. Wolfe
Attorney—Harold H. Flanders

[57] ABSTRACT

A quick opening closure cap for pipelines, tanks, vessels, and other liquid or gas containers.

5 Claims, 6 Drawing Figures

3,672,715

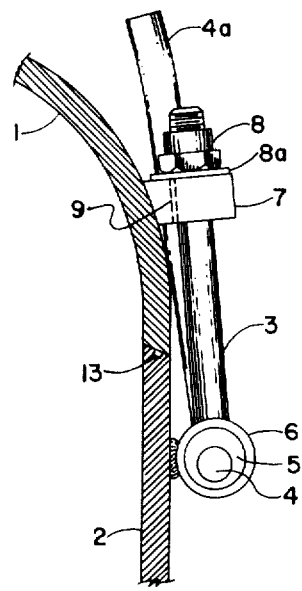
FIG. 3
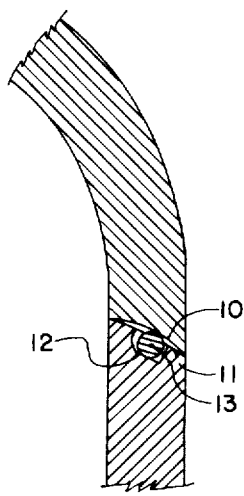
FIG. 4
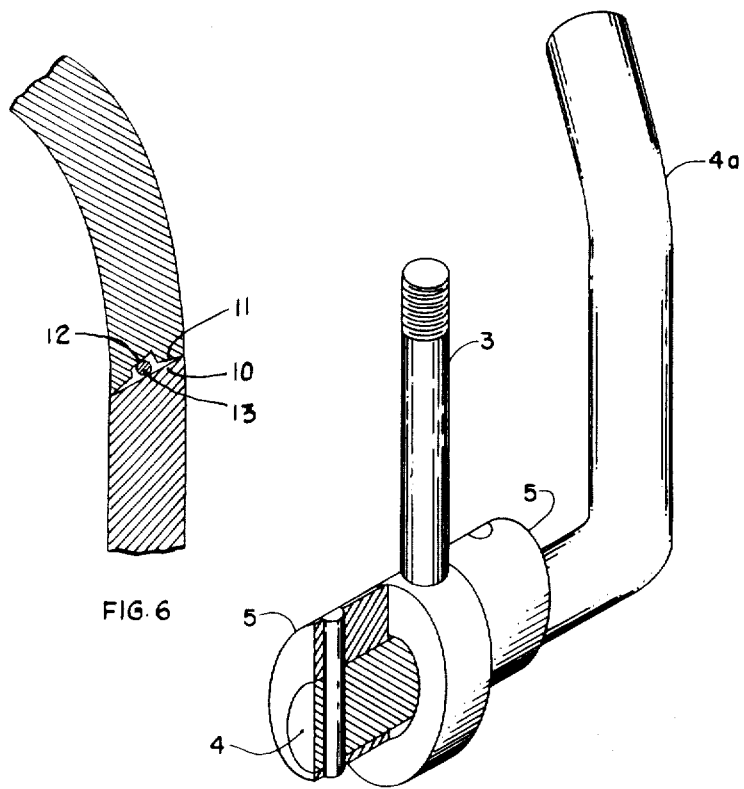
FIG. 6
FIG. 5

QUICK OPENING CLOSURE CAP

BACKGROUND OF THE INVENTION

The present invention generally consists of a quick opening vessel or pipeline closure device and more specifically consists of a cylindrical hub or base and an ellipsoidal or curved domed cap which utilizes cam release levers on the swing bolts holding the closure tight against the hub.

The quick opening closure devices of the prior art generally require, for opening or closing, the loosening or tightening of hex nuts on a series of swing bolts stationed around the periphery of the closure cap. Because of the nature of caustic and corrosive liquids stored in the vessels and pipelines, the inadvertent rough handling and physical wear on these swing bolts, and accumulations of rust, dirt, and other contaminants, the bolt threads are often in such bad condition that removal of the closure is difficult and considerable man hours must be expended before removal can be accomplished. Also, paint and rust-prevention compounds which are applied to the entire closure apparatus tend to clog the threads of the swing bolts and further complicate removal.

If the swing bolt threads are machined loose enough to allow easy removal of the hex nuts holding the swing bolts in place, then the hex nuts are capable of working loose by themselves due to temperature and pressure variations both inside and outside the vessel and also through physical vibrations of the vessel or pipeline arising from its use in service.

Accordingly, it is an object of this invention to provide a quick opening and quick sealing closure cap for pipelines, tanks, vessels, and liquid containing apparatus, which closure cap eliminates the need for loosening and tightening numerous swing bolts or other threaded devices such as those found on similar closures in the prior art.

It is a further object of this invention to provide an easy to open closure cap which requires no tools and very little work or exertion by the person removing the cap.

It is a further object of this invention to provide a tight sealing closure cap with sealing ability and safety features superior to any closure devices disclosed by the prior art.

It is also an object of this invention to provide a new swing bolt type fastening apparatus that can be used to provide easier and quicker-opening closure devices such as the one described in this invention.

Other objects and a fuller understanding of the invention may be had by referring to the following description and claims taken in conjunction with the accompanying drawings.

The present invention overcomes the deficiencies of the prior art and achieves its objectives by providing an eccentric cam tightening and releasing device used in conjunction with a modified swing bolt and special hex nut to give a new and valuable fastening device for use on a closure apparatus. Also a new closure device is disclosed where the mating surface of the hub or base is convex rather than flat beveled and faces either outward or inward. The inward facing surface gives a better seal and the outward facing surface directs outward any contaminants which might fall on the mating surface of the base while it is opened in a vertical position. The mating surface of the cap is concave and its radius of curvature is slightly larger than that of the base, giving metal-to-metal contact at two points on the arc, the inside edge and the outside edge. This provides self alignment of the cap on the base and gives two continuous-line sealing surfaces in addition to the sealing provided by an O-ring gasket located in a groove cut into the mating surface of the hub.

A conventional hinge device or pivotal mounting device joins the cap to the base and allows the cap to swing out 0°-270 and swing back into the same position relative to the base. This maintains the alignment between the swing bolts mounted on the base and the swing bolt mounting lugs located on the cap.

BRIEF DESCRIPTION OF THE DRAWINGS

In order to facilitate the understanding of this invention, reference will now be made to the appended drawings of preferred embodiments of the present invention. The drawings should not be construed as limiting the invention but are exemplary only.

In the drawings:

FIG. 3 is a side view of a typical swing bolt and cam release device;

FIGS. 4 and 6 are blown-up, cutaway views of the mating surfaces of the closure cap and hub with the elastic O-ring gasket enclosed therein; and FIG. 5 is an isometric view of a partially disassembled swing bolt and cam release assembly showing the swing bolt, eccentric cams and actuating arm.

DESCRIPTION OF THE PREFERRED EMBODIMENTS

Figure 1:
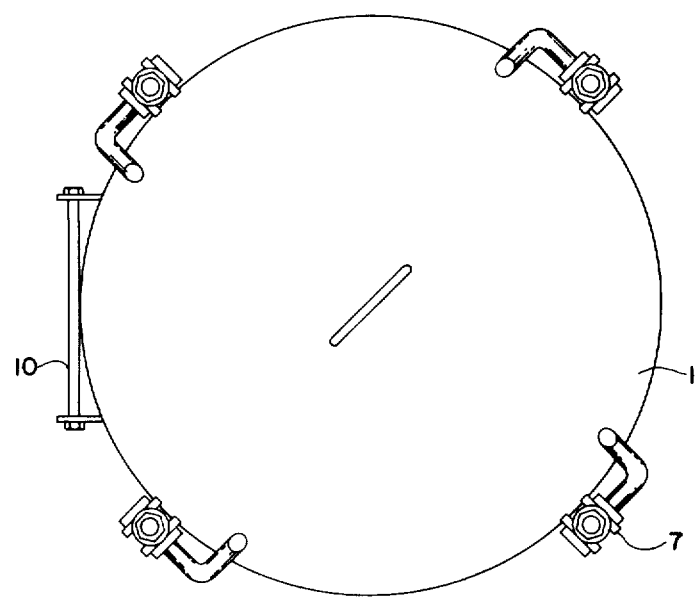
FIG. 1 is a plan view of the assembled closure cap and base.
Figure 2:
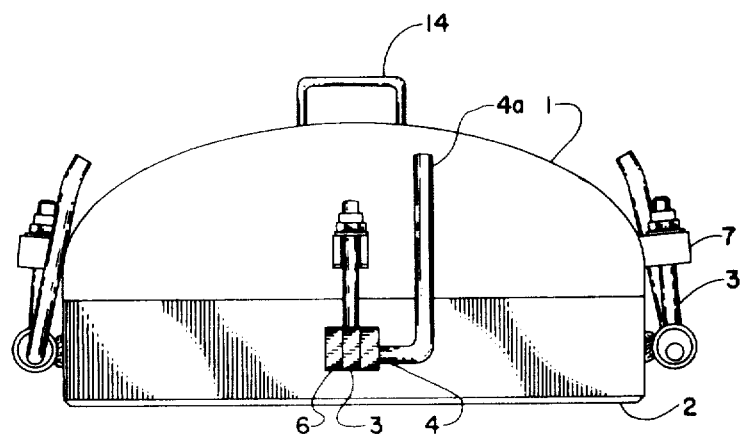
FIG. 2 is a horizontal view of the closure cap and base.
Figure 6:
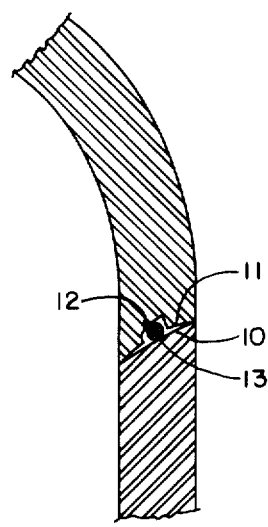

A preferred embodiment of the present invention is shown in FIGS. 1–6 in which a conventional closure cap 1, of ellipsoidal or other curved shape, and a welding hub or base 2 of the same inner and outer diameter as the closure cap, are joined by swing bolts 3 which encircle a cylindrical rod or arm 4 which passes through two cam eccentrics 5. The two cam eccentrics are located at each side of the swing bolt and are attached to the arm rod by pinning, welding, or other means of attachment or are made an integral part of the arm. The cam eccentrics are rotatably attached to the hub by enclosing them in rings 6 whose inner diameter is only slightly larger than the eccentrics' outer diameter. These rings are attached permanently to the hub by welding or other means. The closure cap is also attached to the hub by a hinge device 10 which is joined to the hub and the cap and allows the cap to rotate away from the hub from 0°–270° and yet allows it to return to the hub in the same relative position as it was prior to opening.

The cam eccentric is cylindrical with a diameter approximately 50–100 percent greater than that of the arm, having a hole drilled parallel to its cylindrical axis but off-center so that when the arm rod is passed through the eccentric and firmly attached to it, the point of highest eccentricity lies in or near the plane formed by the arm handle, 4a, and the arm rod 4.

Thus, when the arm handle is in a vertical position, parallel with the swing bolt, the arm rod is forced by the eccentric into its lowest position relative to the hub rings, and the swing bolt is pulled downward by the arm rod so that a pre-set tension is placed upon the swing bolt while it is engaged in the cap lugs 6.

The swing bolt is held to the cap by passing it between parallel lugs 6 which have been welded or otherwise attached to the cap. A spacer plate 9 is placed between the two lugs to prevent the swing bolt from misalignment. A washer 8a and hex nut 8 are threaded onto the swing bolt and tightened down on the lugs while the arm 4a is in an upright position. A partially deformed hex nut is used on the swing bolt so that it will not loosen during use. Because all opening and closing is done with the arm and cam device, the hex nut can be set at specified tightness once and seldom has to be touched again. Although tightening the deformed hex nut is difficult this is not a particularly serious disadvantage since the nut has to be tightened only once initially, and very seldom needs to be adjusted.

The eccentric 5 is designed so that the bolt is at or near its tightest position when the arm handle is parallel to and alongside of the bolt. The arm handle can thus travel a small distance further and contact the closure cap. This "locks" the cam eccentric in place because it has passed the point of highest eccentricity and now requires a certain force to bring it back and over in the opposite direction. The amount of force requred to bring the arm over and down can be varied by varying the amount of tightness of the hex nut during its initial setting. The tighter the hex nut is set initially, the more force will be required to bring the arm back over and down.

When the release arm is at its lowest position the swing bolt is then in its lowest position and can be removed from the cap lugs by hand without having to loosen the hex nut.

An inherent safety feature of the cam release apparatus is that it prevents accidental opening of the closure cap while the contents of the vessel or pipeline are under pressure.

Any pressure in the vessel greater than atmospheric pressure will exert in additional outward force on the closure cap, which force is transmitted through the swing bolts to the eccentric cam, further enforcing the "locking" action established when the eccentric was rotated in the hub ring past the peak of eccentricity. When the pressure is high enough in the vessel to be dangerous the release arm cannot be moved by one man even with a removal tool or "cheater."

Another improvement over the prior art is the sealing surfaces between the cap and the hub. Often, in the prior art, a flat or inclined bevel surface is placed on the edges of the hub and the cap and a groove to hold an O-ring gasket is machined into the cap with a concave inner surface of the groove. The mating surface of the hub is inclined downwardly in an inward direction towards the center line of the closure device, and the matching surface of the cap inclines downwardly to the outside of the closure device.

In this invention, a flat bevel is not used but rather an arcuate convex mating surface is machined on the edge 11 with the center of curvature of the arcuate surface located below the arcuate surface and within the closure device which results in the radial lines of the surface making an angle of 10°–80° with the center line of the closure device. Thus in one embodiment the arcuate surface faces in an outwardly direction so that a surface is obtained that will spill outwardly any contaminants which might fall on the mating surface of the hub. The mating surface of the cap 10 is arcuate and concave and is inclined downward and toward the center line of the closure. The center of curvature of the arcuate surface of the cap is located on the same line as the center of curvature of the arcuate surface of the hub but the radius of curvature is made slightly larger than that of the hub's so that metal-to-metal contact occurs only at the outer and inner edges of the mating surfaces. In a second embodiment in FIG. 6 the mating surface of the hub faces inward for a stronger seal.

An O-ring groove 12 is machined into the hub or the cap and has flat parallel or trapezoidal sides with no curvature to either of the sides. An O-ring gasket 13 extends out of the groove a sufficient distance to make contact with the upper surface before the edges of the mating surfaces contact each other, thereby causing a compression of the O-ring gasket in the fully closed position and resulting in a positive sealing action.

In operation, a closure cap with a number of lugs is placed on the hinge of a matching hub with an equal number of swing bolts. An O-ring gasket is inserted in the O-ring groove and the cap is swung closed onto the hub. The swing bolts are engaged in their respective lugs and the release arms are brought up and over to rest against the cap. The threaded nuts on the swing bolts are then tightened to the desired tension. The arms have been shaped so that there is space enough for the operator's hand to fit between them and the cap even in the fully closed position. The closure cap and hub are now fully sealed and ready to withstand pressures up to and above 450 pounds per square inch.

It should be mentioned that the handle 14 by which the closure cap is lifted can be placed near the center of the cap to avoid conflict with the release arms. It is also contemplated that a device using levers, a large ring, cables, or other similar means can be used to actuate all of the release arms simultaneously in order to more quickly install or remove the closure cap.

In a test of this invention, a 24 inch closure cap was placed on a matching hub with six cam release swing bolts spaced equally around the hub. The closure was sealed by engaging the swing bolts in the lugs and bringing the release arms over against the cap in the tightened position. High pressure water was forced into the closure hub which had been welded onto a blank steel plate for the purposes of this test. At a pressure of 450 pounds per square inch neither the seal, the swing bolts, nor the release arms showed any signs of weakening or failure. An attempt was made to swing the release arms back and down but they were locked securely in place.

The pressure was slowly bled off and only when it reached 20 pounds per square inch could the operator with the use of a "cheater" disengage one of the release arms. At this pressure the seal remained intact until four adjacent release arms were released, at which point it drained slowly down to zero because the swing bolts were left loosely engaged in the lugs as an added safety measure. They were then easily disengaged and when the two remaining arms were released the closure could be lifted off of the hub.

Other possible embodiments of this invention might utilize fasteners other than threaded swing bolts, release arms in different configurations, cam eccentrics in shapes other than cylindrical and/or closures in shapes other than ellipsoidal.

What is claimed is:

1. A quick opening closure device for a pipeline, vessel, tank or other liquid or gas container comprising: a cylindrical hub; a cylindrical, ellipsoidal domed cap attached to said cylindrical hub by a hinge device; said cylindrical hub and said cylindrical domed cap being of the same diameter; an O-ring gasket between said hub and said cap, said O-ring gasket being located in a groove in said cap; and a plurality of quick opening fasteners attached to said hub and said cap, wherein said quick opening fasteners comprise one or more cams attached to a release arm which passes through a swing bolt containing thereon a flat washer and a threaded nut, with said cams being rotatably attached to said cylindrical hub, and said swing bolt being capable of engaging in matching parallel lugs permanently attached to said domed cap, and wherein said cams are encircled by constraining rings permanently attached to said hub.

2. A quick opening closure device as in claim 1 which has greatly improved sealing surfaces comprising arcuate mated surfaces with their centers of curvature along a single line but with slightly different radii of curvature, with the cap sealing surface having the larger radius of curvature.

3. A quick opening closure device as in claim 2 which has said arcuate sealing surface of said hub inclined downward in an outward-facing direction and said arcuate sealing surface of said cap inclined upward in an inward-facing direction.

4. A quick opening closure device as in claim 2 which has said arcuate sealing surface of said hub inclined downward in an inward facing direction and said arcuate sealing surface of said cap inclined upward in an outward-facing direction.

5. A quick opening fastening device for fastening together upper and lower members comprising a pair of rings to be permanently attached to the lower fastened member, a pair of eccentric circular cams rotably fitted within said rings, a release arm passing through and permanently attached to said circular cams parallel to and a measurable distance from the axis of rotation of said cams, a threaded swing bolt with one end encircling said release arm between said circular cams, a flat washer and threaded nut screwed on the free end of said threaded swing bolt, and a pair of lugs permanently attached to the upper fastened member and engaging said washer held on said threaded swing bolt by said nut.

* * * * *